No. 841,052. PATENTED JAN. 8, 1907.
M. E. ROTHBERG & A. ERNST.
COKE OVEN.
APPLICATION FILED OCT. 8, 1906.

3 SHEETS—SHEET 1.

Witnesses
Stuart Hilder
George M. Anderson

Inventors
M. E. Rothberg,
Alfred Ernst,
By E. W. Anderson
their Attorney

No. 841,052. PATENTED JAN. 8, 1907.
M. E. ROTHBERG & A. ERNST.
COKE OVEN.
APPLICATION FILED OCT. 8, 1906.

3 SHEETS—SHEET 2.

Witnesses
Stuart Hilder.
George M. Anderson.

Inventors
M. E. Rothberg
Alfred Ernst
By
E. W. Anderson
their Attorney

No. 841,052. PATENTED JAN. 8, 1907.
M. E. ROTHBERG & A. ERNST.
COKE OVEN.
APPLICATION FILED OCT. 8, 1906.
3 SHEETS—SHEET 3.
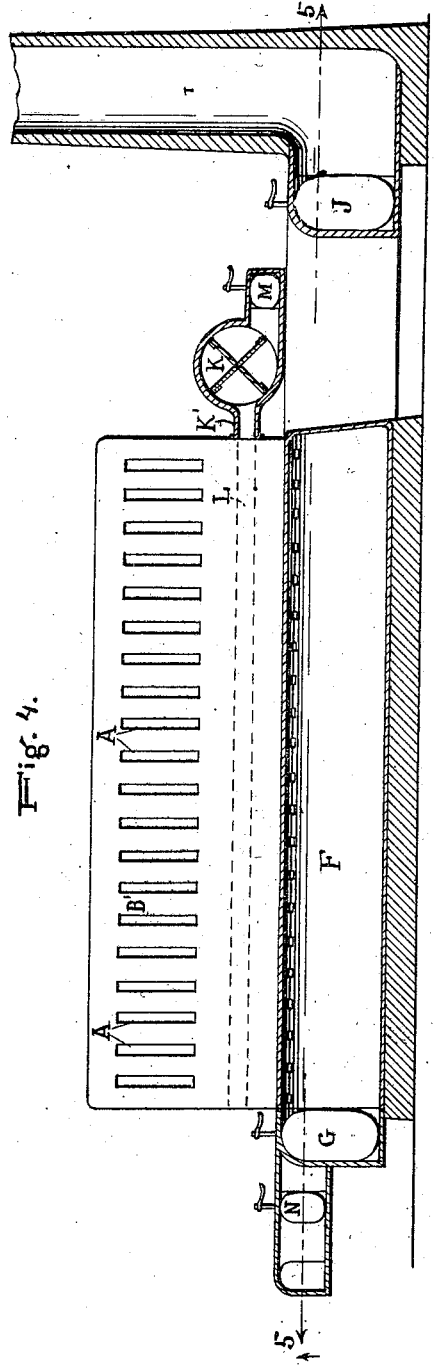
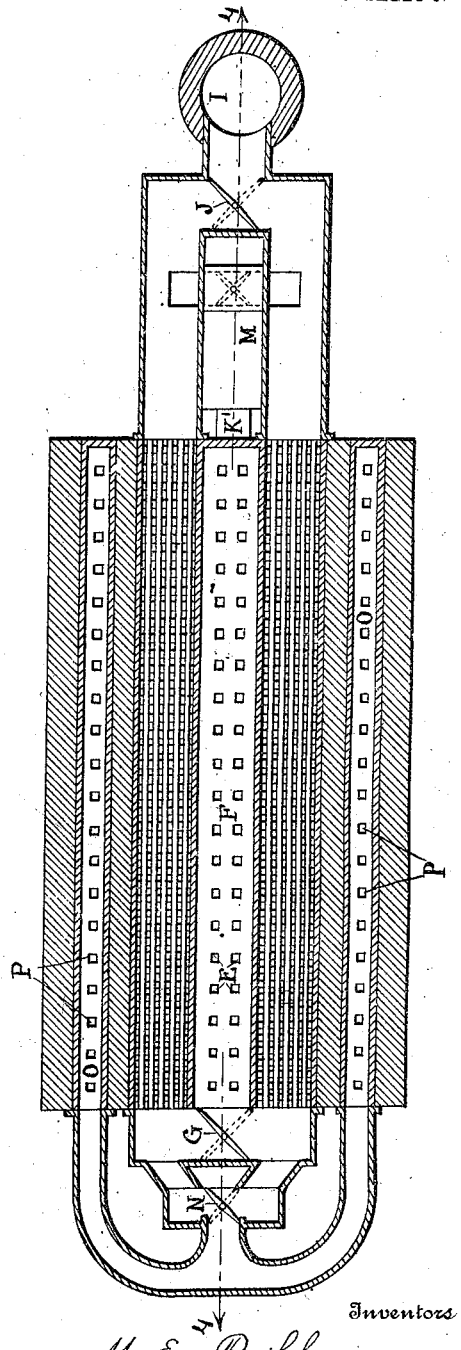
Witnesses
Stuart Hilder
George M. Anderson
Inventors
M. E. Rothberg
Alfred Ernst
By E. W. Anderson
their Attorney

UNITED STATES PATENT OFFICE.

MATHEW E. ROTHBERG AND ALFRED ERNST, OF PITTSBURG, PENNSYLVANIA.

COKE-OVEN.

No. 841,052.  Specification of Letters Patent.  Patented Jan. 8, 1907.

Application filed October 8, 1906. Serial No. 338,048.

*To all whom it may concern:*

Be it known that we, MATHEW E. ROTHBERG and ALFRED ERNST, citizens of the United States, residents of Pittsburg, in the county of Allegheny and State of Pennsylvania, have made a certain new and useful Invention in Coke-Ovens; and we declare the following to be a full, clear, and exact description of the same, such as will enable others skilled in the art to which it appertains to make and use the invention, reference being had to the accompanying drawings, and to letters of reference marked thereon, which form a part of this specification.

Figure 1:
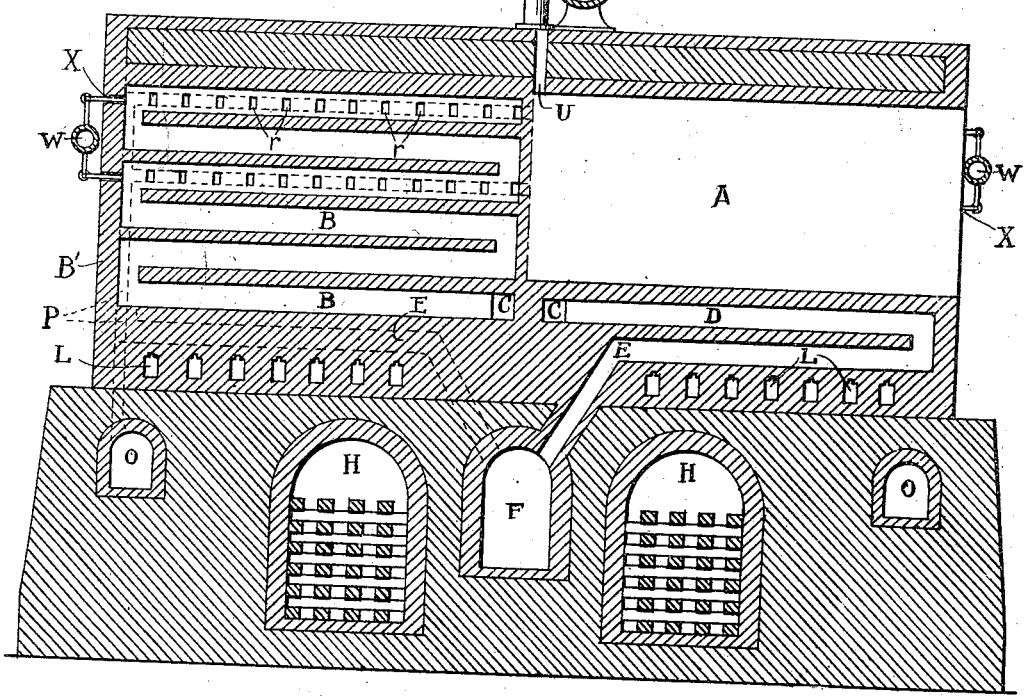
Figure 2:
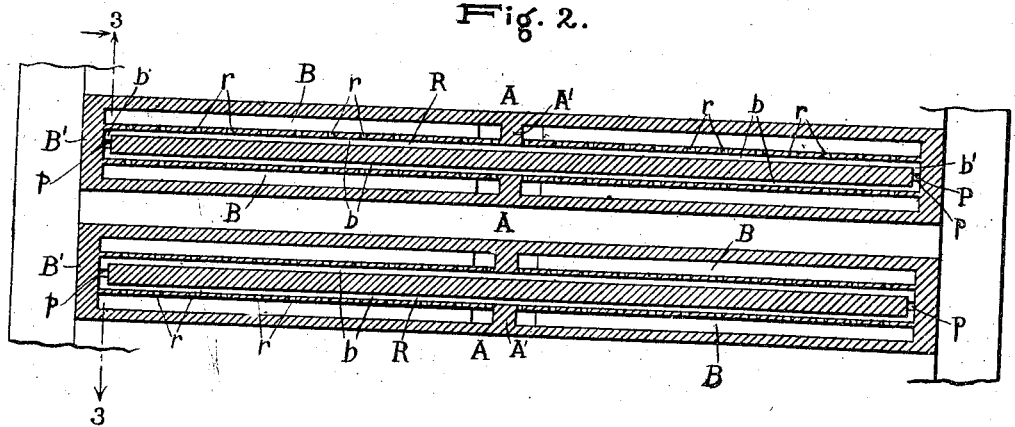
Figure 3:
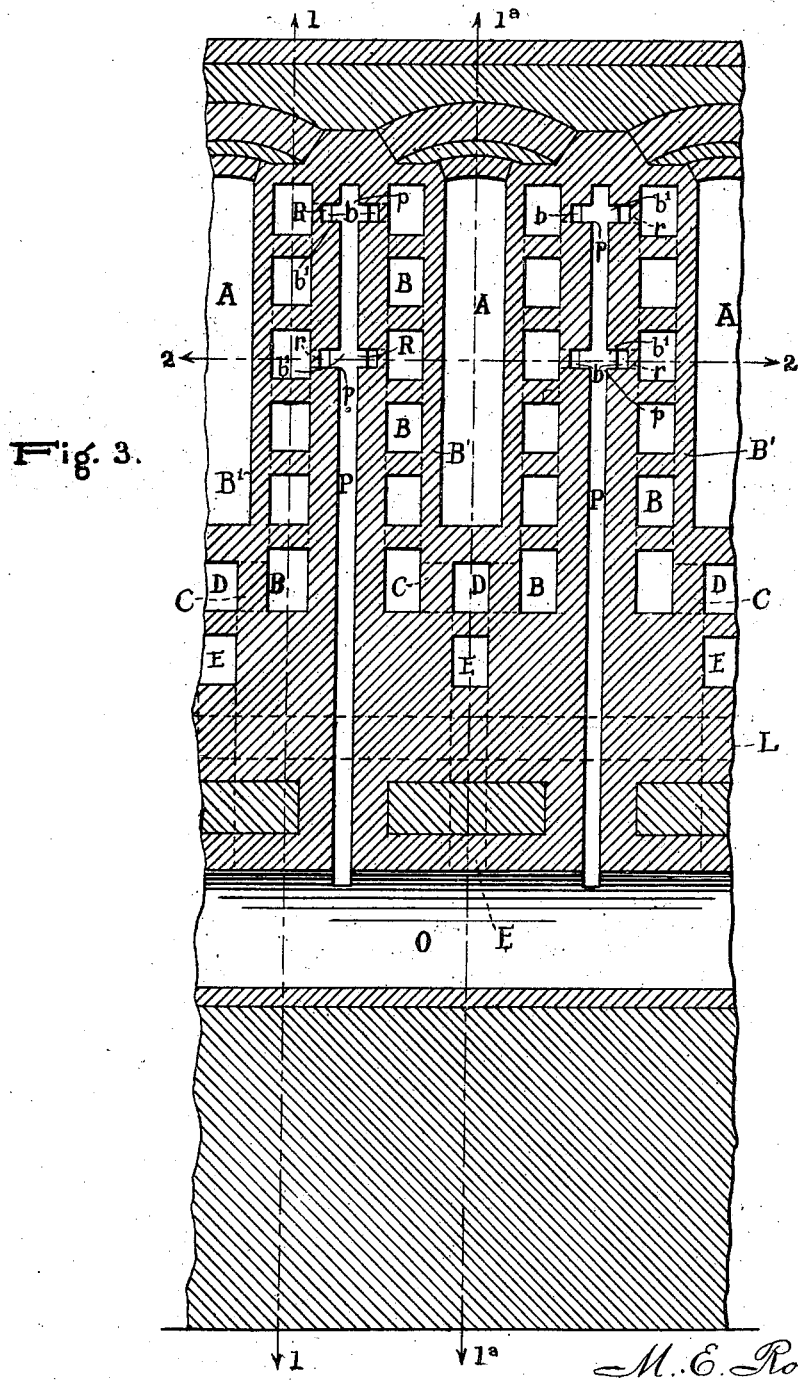

Figure 1 represents vertical half-sections taken through the heating-flues in the side walls and through the oven-chamber on the lines 1 1 and 1ª 1ª. Fig. 2 is a horizontal section on the line 2 2, Fig. 3. Fig. 3 is a vertical section on the line 3 3, Fig. 2. Fig. 4 is a section on the line 4 4, Fig. 5, the upper part of the ovens being shown in side elevation. Fig. 5 is a section on the line 5 5, Fig. 4.

The invention relates to coke-ovens, having for its object the provision of means for obtaining a uniform distribution of heated air to the combustion-chambers of ovens having heating-flues in the side walls thereof between adjacent coking-chambers.

The invention is shown as applied to the oven disclosed in our pending application, Serial No. 305,351, allowed August 17, 1906.

The invention consists in the novel construction and combinations of parts, as hereinafter set forth.

In the accompanying drawings, illustrating the invention, the letters A A designate the coking-chambers, and B B reverting heating-flues in the side walls of such chambers, laterally opposite series of such flues being shown as provided in each dividing-wall B' between adjacent coking-chambers at each side of the transverse center partition A' in the hollow wall. The series of flues, of which there are shown four in each side wall, are thus also shown as arranged endwise opposite in couples. There can be two, four, or more flues in each hollow side wall.

Each series of heating-flues, the members of which are shown as horizontal, has communication at the bottom through short lateral extensions C, with flue D, located under the oven-chamber, a downward-directed passage E connecting each flue D with a central waste-gas main F in the foundation running longitudinally of the oven-battery. The waste-gas main F extends beyond the battery of ovens at one end thereof, where it is provided with a butterfly-valve G, controlling the communication of the main F with flanking regenerator-chambers H H at each side. These regenerator-chambers extend beyond the ovens at each end and beyond the main F at one end into communication with the stack I, the opening to which is controlled by a butterfly-valve J, which cuts off one chamber from communication with the stack, while it throws the other chamber into communication therewith in an alternate manner.

K is a fan located outside of the oven-battery between the stack I and the termination of the main F at one end of the ovens and which, through passage K', communicating with flues L in the floor of the ovens, establishes a circulation of air, blowing the same, through the medium of the butterfly-valve M, into one end of the regenerator-chambers H H alternately and through the medium of a similar valve N controlling the communication of the other ends of said chambers with hot-air mains O O alternately from said chambers into the hot-air mains. These hot-air mains O O run longitudinally in the oven foundation laterally of the regenerator-chambers and have connection with the combustion-chambers in the side walls of the ovens in the following manner.

At regular intervals hot-air flues P P extend upward from the hot-air mains O O to the same height as the horizontal flues B B, said hot-air flues being located at the sides of the oven-battery in the walls B' between adjacent coking chambers. Each couple of vertical branch flues P P at opposite sides of the battery are connected at the upper portion of the wall B' by horizontal transverse passages R R, located between the laterally-opposite series of heating-flues B B in such side wall. These passages R R, two of which are shown in each wall B' for each couple of laterally-opposite series of heating-flues, have short lateral extensions r r at short and regular intervals throughout their length, connecting the passages with the uppermost flue B and with the third flue B from the top of each series.

As shown, the passages R R, connecting each couple of branch flues P P, are each of double character, having a long branch b at each side of the wall B' near the flues B, the walls B' being pierced at each side between such long branches b and the heating-flues to form the lateral extensions r r, each branch b having thus separate communication with a series of flues B. The long branches b are connected at the ends by short branches b', communicating at the center with the flues P at p. In this manner the heated air which is supplied from the hot-air mains in the foundation, has regular distribution directly throughout the length of the upper heating-flues B, and the direction of the draft being downward through all of the flues B to the waste-gas main the combustion reaches a maximum of perfection.

The gases liberated from the charge of coal in the ovens pass through flues U to the gas-main V, by which they are conducted in the usual manner to a condensing-house (not shown) for the removal of the tar and ammonia. The gases are then returned to the ovens by piping, which is in connection with the feed-pipes W W, having burner connections X X, located in the heating-flues.

The supply of air to the heating-flues in the side walls is continuous and moves in the same direction throughout the operation of the ovens, air being drawn in through the flues L in the floor of the ovens by the fan K and blown through the regenerator-chambers H H and the hot-air mains O O alternately. From each hot-air main O the air is continuously supplied to the heating-flues in the side walls. The air-supply is at the same time continuously heated by the waste gases of combustion, which are drawn in a continuous manner from the heating-flues into the central waste-gas main F, from which they are drawn through the regenerator-chambers H H alternately. From these chambers the waste gases pass continuously and in the same direction to the stack.

Having thus described our invention, what we claim as new, and desire to secure by Letters Patent, is—

1. The combination with an oven having a series of horizontal reverting heating-flues in each side wall, and a hot-air supply, of means having connection with the hot-air supply for distributing hot air directly throughout the length of the upper flue of each series, and means of connection for the lower flue of each series with the stack.

2. The combination with an oven having a plurality of series of laterally-opposite horizontal reverting heating-flues in each side wall, and a hot-air supply, of means having connection with the hot-air supply and located between the series of heating-flues for distributing hot air directly to the upper flue of each series throughout its length, and means of connection for the lower flue of each series with the stack.

3. The combination with an oven, having a plurality of series of laterally-opposite horizontal reverting heating-flues in each side wall, and a hot-air supply, of branched means for distributing hot air located between the series of heating-flues, each branch having separate communication with the upper flue of each series throughout the length of the same, means of connection for said branched means with the hot-air supply, and means of connection for the lower flue of each series with the stack.

4. The combination with an oven, having heating-flues in its side walls, and a hot-air supply, of upward-extending hot-air flues connected with the hot-air supply, and horizontal flues connecting said hot-air flues and having communication with said heating-flues.

5. The combination with an oven having a plurality of series of laterally-opposite heating-flues in each side wall, and a hot-air supply, of upward-extending hot-air flues having connection with the hot-air supply, horizontal flues connecting the hot-air flues and located between the series of heating-flues in each side wall, said horizontal flues having connection at opposite sides with the series of heating-flues.

6. The combination with an oven having a series of heating-flues in each side wall, and a hot-air supply, of horizontal flues in the side walls having communication with the upper portion of said heating-flues throughout the length of the same, means of connection for the lower portion of said heating-flues with the stack, and means of connection for said horizontal flues with the hot-air supply.

7. The combination with an oven having a series of horizontal reverting heating-flues in each side wall, and a hot-air supply, of horizontal flues in the side walls having communication with the upper of said heating-flues throughout the length of the same, means of connection for the lower of said heating-flues with the stack, and means of connection for said horizontal flues with the hot-air supply.

8. The combination with an oven, having a plurality of series of laterally-opposite heating-flues in each side wall, and a hot-air supply, of a horizontal hot-air flue located between said series of heating-flues in each side wall, and having separate branched communication with the upper portion of the flues of each series, means of connection for the horizontal flues with the hot-air supply, and means of connection for the lower portion of the heating-flues of each series with the stack.

9. The combination with an oven, having a plurality of series of laterally-opposite horizontal reverting heating-flues in each side wall, and a hot-air supply, of a horizontal hot-air flue located between said series of heating-flues in each side wall and having separate branched communication with the upper flue of each series, means of connection for the horizontal flues with the hot-air supply, and means of connection for the lower flue of each series with the stack.

10. In an oven, the combination of a plurality of series of heating-flues in each side wall, hot-air mains in the base, vertical hot-air flues having connection with said mains, a plurality of horizontal flues in each side wall connecting said vertical hot-air flues, each of said horizontal flues including a branch at each side having lateral extensions throughout its length communicating with the upper portion of the series of heating-flues at that side, and means of connection for the lower portion of each series of flues with the stack.

11. In an oven, the combination of a central waste-gas main in the base, two endwise opposite series of horizontal reverting heating-flues in each side wall, two endwise opposite flues under the oven having short lateral connections with the lower flues of said series and downward-directed extensions communicating with the waste-gas main, and means for supplying hot air directly throughout the length of the upper flue of each series.

12. In an oven, the combination of a waste-gas main in the base, a series of horizontal reverting heating-flues in each side wall, a flue under the oven-chamber having a short lateral connection with the lower flue of each series and a downward-directed extension communicating with the waste-gas main, and means for supplying hot air directly to the upper flue of each series of heating-flues throughout the length of the same.

13. In an oven, the combination of a central waste-gas main in the base, lateral hot-air mains, a plurality of endwise opposite series of horizontal reverting heating-flues in each side wall, flues under the oven-chambers having short lateral connections with the lower heating-flues of the series and downward-directed extensions communicating with the waste-gas main, a horizontal hot-air flue in the upper portion of each side wall having lateral extensions throughout its length communicating with the upper heating-flue of each series, and vertical hot-air flues connecting the ends of the horizontal flues with the hot-air mains.

14. In an oven, the combination of a central waste-gas main in the base, lateral hot-air mains, hollow side walls provided each with a central partition, laterally-opposite series of horizontal reverting heating-flues in each side wall on each side of said partition, a horizontal hot-air flue in the upper portion of each side wall between said series and including a branch at each side having lateral extensions throughout its length communicating with the upper flues of the series on each side, and vertical flues connecting the ends of the horizontal flues with the hot-air mains.

15. In an oven, having heating-flues in its side walls, means for continuously supplying air in the same direction directly to the upper portion of said heating-flues, means located beneath the oven and disposed at right angles to the oven-chamber for continuously heating the air-supply through the waste gases of combustion, and means for continuously withdrawing the waste gases of combustion in the same direction having connection with the lower portion of said heating-flues.

16. In an oven having a series of horizontal reverting heating-flues in each side wall, means for continuously supplying air in the same direction directly to the upper flue of each series, means for continuously heating the air-supply through the waste gases of combustion, and means for continuously withdrawing the waste gases of combustion having connection with the lower heating-flues of the series.

In testimony whereof we affix our signatures in presence of two witnesses.

MATHEW E. ROTHBERG.
ALFRED ERNST.

Witnesses:
HUGH PRENTICE,
HOWARD F. JOHNSON.